Oct. 20, 1931.  H. E. SPENCER  1,827,881
COVER PLATE
Original Filed Feb. 25, 1929   2 Sheets-Sheet 2

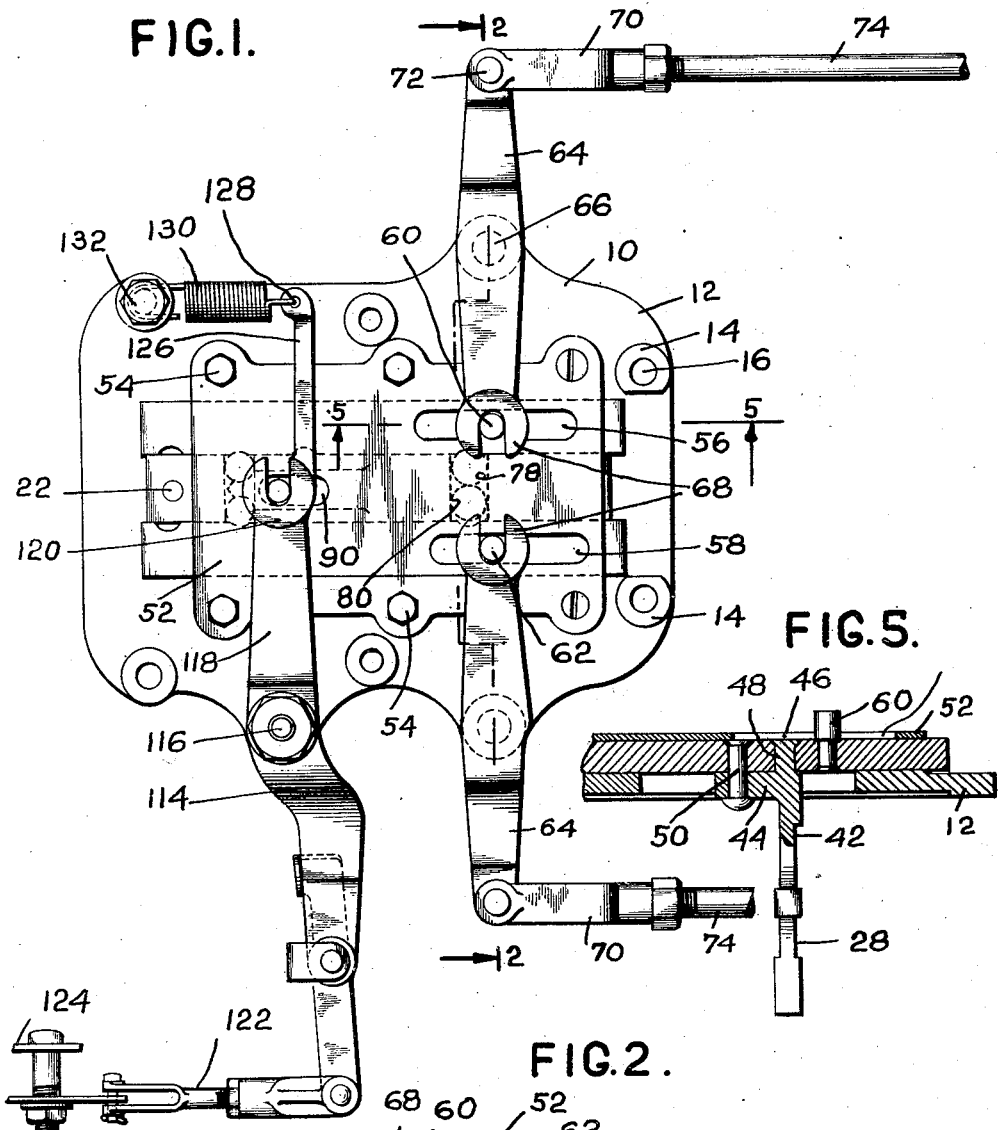

Inventor
Harry E. Spencer
By his Attorney
Hoguet + Neary

Patented Oct. 20, 1931

1,827,881

UNITED STATES PATENT OFFICE

HARRY E. SPENCER, OF NEW HAVEN, CONNECTICUT, ASSIGNOR TO UNIVERSAL GEAR SHIFT CORPORATION, OF NEW YORK, N. Y., A CORPORATION OF DELAWARE

COVER PLATE

Original application filed February 25, 1929, Serial No. 342,685. Divided and this application filed March 29, 1929. Serial No. 351,014.

This invention relates in general to pneumatic gear shifts; and in particular to cover plates for the transmission gear boxes of automobiles equipped with pneumatic gear shifts.

It is an object of the invention to provide a cover plate embodying a portion of the mechanism necessary for automatic shifting of the gears of a car.

Another object is to provide improved means for locking the shifting mechanism at all times, except when actually shifting the gears.

Another object is to provide a mechanism for preventing the shifting of one set of gears while another set is in mesh.

Other objects of the invention will appear as the description proceeds.

This application is a division of my prior application, Serial No. 342,685, filed Feb. 25, 1929.

My invention will be best understood from the following description taken with the accompanying drawings in which:

Fig. 1 is a plan view of my improved cover plate and associated parts;

Fig. 2 is a vertical section taken substantially along the line 2—2 of Fig. 1;

Fig. 5 is a vertical section taken substantially along line 5—5 of Fig. 1.

Figure 3:
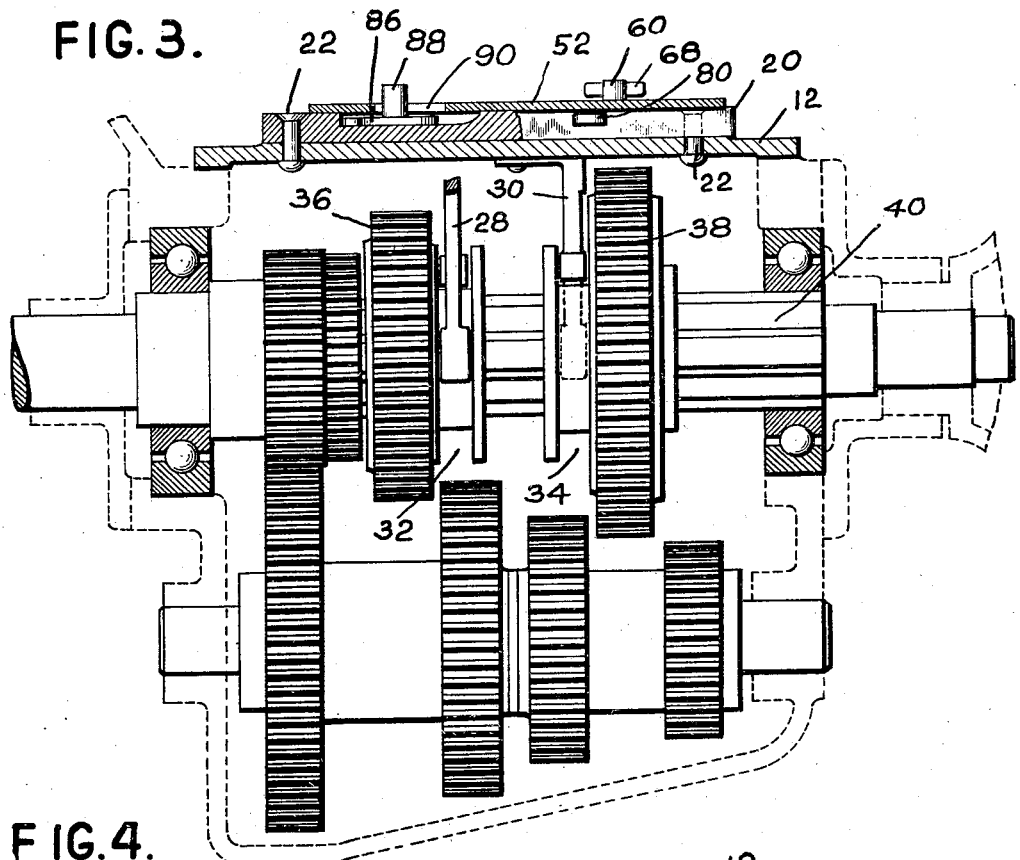
Fig. 3 is a vertical side view, partly in section, of a conventional transmission gear box with my cover plate applied.

Referring now to the drawings in which like reference characters denote like elements throughout, I have shown at 10, a cover plate which may be substituted for the usual cover plate of the transmission housing, and which carries my improved shifting and locking mechanism. This cover plate comprises a base plate 12 which is provided with projecting collars 14. These collars are drilled as at 16, and are so located that they will register with the bolts of the stock transmission housing.

On the base plate 12 are formed two parallel upstanding guides 18. A rib 20 is mounted between and parallel with these guides, and may be fastened to the base plate in any desired manner such as by rivets 22 or otherwise. Sliding between rib 20 and guides 18 are slip rods 24 and 26; their function is to actuate shifting forks 28 and 30. These shifting forks are operatively connected with collars 32 and 34 integral with gears 36 and 38, the latter being splined to driven shaft 40. The details of the shifting mechanism need not be described, since my improved cover plate is capable of use with any gear shift.

The shifting forks 28 and 30 are mounted upon slip rods 24 and 26 in a novel manner, as can be best seen from Fig. 5. The fork comprises a body portion 42 and an end portion 44. A locating stud 46 extends upward at right angles to end portion 44 and is adapted to register with a hole 48 drilled in the slip rod. After inserting the locating stud in its appropriate hole, a rivet 50 may be applied thru the end portion and slip rod, and then the outer end of locating stud 46 is upset to provide a second rivet-like connection. This construction is necessary in order to avoid the use of two legs upon the shifting fork. It will be seen that a second end portion extending in the opposite direction from 44 would interfere with the lateral movement of the shifting fork. Increasing the size of the slot in which the fork slips is not possible; hence the construction described is the only practicable manner of obtaining a simple connection between slip rod and shifting fork.

A top plate 52 is mounted over rib 20 and slip rods 24 and 26, being held in place by bolts 54 or any other conventional means. I provide slots 56 and 58 in this top plate thru which project lugs 60 and 62. These lugs are fixed to the slip rods, and are used in moving the slip rods in the following manner: A lever 64 is pivoted to the base plate at 66. The inner arm of this lever bears a slotted head 68, which permits sliding operative connection between the lever arm and the slip rod. A stirrup 70, pivoted to the outer arm of the lever at 72 is connected, by means of connecting rods 74, to the piston of a conventional gear shifting cylinder. Details of the cylinder and its connection are shown in the parent case of which this application is a division, and need not be further described at this time.

Figure 4:
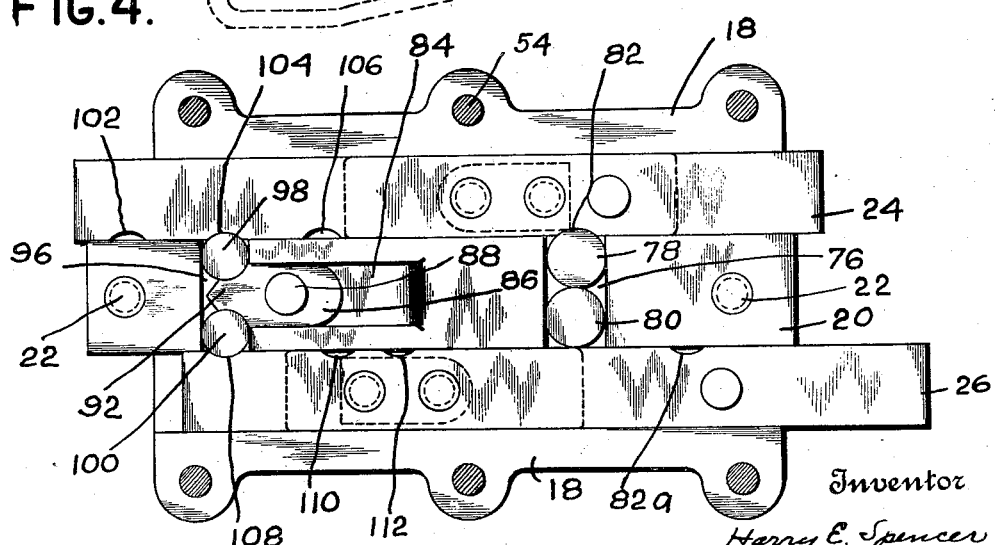
Fig. 4 is a detail plan view showing the slip rods and the locking mechanism.

In Fig. 4 I have shown the details of my locking mechanism, which will now be described. A groove 76 is made in rib 20, and transversely thereof. This groove may be approximately one-half the depth of the rib. Its length is regulated by the diameter of discs 78 and 80, whose dimensions are determined in the following manner. On the inner face of each slip rod is a semi-cylindrical depression 82 and 82a. This depression is so located that, when the slip rod, and consequently the gears which it controls are in the position corresponding to neutral, the aforesaid depression will be adjacent groove 76. Discs 78 and 80, which slide freely in groove 76, are of such a diameter that their combined widths are exactly equal to the width of rib 20 plus the depth of one of the depressions 82 or 82a. The width of groove 76 (that is to say, its dimension as measured from right to left in Fig. 4) is the same as the diameter of either of the discs.

The structure just described comprises my improved drift lock, whose operation is as follows: Assuming the car to be in neutral, it is obvious that slip rods 24 and 26 will be in such a position that depressions 82 and 82a will coincide with groove 76. Discs 78 and 80 will then be free to slide from side to side, entering the depression of either slip rod. But, if one of the slip rods be moved, in the process of shifting gears, the adjacent disc will, of course, be forced out of its corresponding depression 82 or 82a and will be pushed entirely into groove 76. This will compel the other disc to enter the depression in its corresponding slip rod. In this manner the second slip rod will be locked firmly in position and will not be movable until the first slip rod and its gears are restored to neutral. For example, in Fig. 4, slip rod 26 as illustrated is moved to the right. This forces disc 80 completely into groove 76. Disc 78 is thereby forced into depression 82 in slip rod 24. If now an attempt be made to move slip rod 24, it will be found that the pressure against discs 78 and 80 and the smooth face of slip rod 26 will prevent movement of slip rod 24. If, however, slip rod 26 be restored to neutral position, then if slip rod 24 be moved, disc 80 will be forced into depression 82a disc 78 will be entirely within groove 76, and slip rod 26 will in its turn be locked in neutral position. It will be seen, therefore, that I have provided an extremely simple and compact locking mechanism, which will effectually prevent the movement of one slip rod or the gears connected with it as long as the gears controlled by the opposite slip rod are in mesh. This avoids any possibility of two sets of gears meshing simultaneously, with the disastrous consequences that would necessarily result.

It sometimes occurs that the driver of an automobile will attempt to shift gears without disengaging the clutch. When gears are shifted by hand, their clashing will give warning of this mistake, and they can be instantly released. In any automatic gear shift, however, since the action is positive, it is necessary to guard against any possibility of shifting except with a disengaged clutch. With this object in view, I provide a locking mechanism which is operatively connected with the clutch pedal in such a manner that the slip rods can not be moved except when the clutch is disengaged.

A groove 84 is formed longitudinally in rib 20. Slidably mounted in this groove is a dagger element 86. This dagger has upon its top surface a lug 88 extending thru a slot 90 in the top plate 52, in a manner similar to that described for lugs 60 in the slip rods. One end of this dagger is in the form of a wedge 92. Longitudinal groove 84 terminates at one end in a transverse groove 96. Sliding in groove 96 are two discs 98 and 100. These discs are similar to, but smaller than, the preivously described drift lock discs 78 and 80.

In slip rod 24 are three semi-cylindrical depressions 102, 104 and 106. Similar depressions 108, 110 and 112 are formed on the inner face of slip rod 26. These depressions are located on the inner faces of slip rods 24 and 26 in such a manner that, when the slip rods are in neutral position, depressions 104 and 110 will be opposite groove 96; depression 102 will be opposite groove 96 when slip rod 24 is moved to a position which we may, for illustration, call first speed; depression 106 will register with groove 96 when slip rod 24 is moved to what we may call second speed. Depressions 108 and 112 similarly register with groove 96 when slip rod 26 is in the proper position corresponding to the gear shifts which it controls.

The dimensions of discs 98 and 100 are such that they do not completely fill the transverse dimensions of groove 96. The operative end 92 of dagger 86 is adapted to enter between these discs and force them apart into the depressions which happen to register at the time with groove 96. I provide a mechanism for automatically controlling this wedge action of dagger 86. A lever 114 is pivoted on the base plate at 116. One arm 118 of this lever bears a slotted head 120 which engages lug 88 on the dagger, and is adapted to make it slide in groove 84. The other arm of lever 114 is attached by a conventional linking mechanism 122 to a clamp 124, which is adapted to surround the clutch pedal arm. Extending outwardly from head 120 is an arm 126. This arm has an eye 128 in its outer extremity. A spring 130 anchored at 132 tends constantly to pull the arm 126, and consequently head 120, lug 88 and dagger 86 to the left in Figs. 1 and 4, or in the direction which will constantly tend to cause dagger 86 to wedge between discs 98 and 100. Depression of the clutch pedal, acting through connecting element 122, will move the lever arm 118 in a manner to counteract the pull of spring 130, and will move the dagger 86 to the right, out of engagement with the aforesaid discs.

The action of the clutch lock should now be clear. When the clutch is in, spring 130 will force dagger 86 between discs 98 and 100. These discs will therefore be forced outwardly, and they will project into the depression on the inner faces of slip rods 24 and 26, thereby locking the slip rods against any movement. When, however, the clutch pedal is depressed, lever arm 118 will release the dagger from engagement with the discs, and, if an attempt is made to move one of the slip rods, the corresponding discs will be pushed inwardly, out of engagement with said rod, and shifting of the gears will be possible. As long however, as the clutch is engaged, the locking mechanism will prevent movement of the slip rods.

It is to be understood of course, that while I have indicated a specific and preferred form of my mechanism, this is to be considered as illustrative only and my invention is to be considered broadly, and limited only by the prior art and the scope of the appended claims.

I claim:

1. A transmission cover plate for a pneumatic gear shift, comprising a base plate, a cover plate spaced therefrom, slip rods slidably mounted between said plates, a clutch lock, comprising a pair of discs, a plurality of corresponding depressions in said slip rods, and means for forcing said discs into certain of said depressions, and in locking engagement with said slip rods.

2. A transmission cover plate for a pneumatic gear shift, comprising a base plate, a cover plate spaced therefrom, slip rods slidably mounted between said plates, a clutch lock, comprising a pair of discs, a plurality of corresponding depressions in said slip rods, and means for forcing said discs into certain of said depressions, and in locking engagement with said slip rods, said means comprising a wedge shaped element adapted to enter between said discs and force them apart.

3. A transmission cover plate for a pneumatic gear shift, comprising a base plate, a cover plate spaced therefrom, slip rods slidably mounted between said plates, a clutch lock, comprising a pair of discs, a plurality of corresponding depressions in said slip rods, means for forcing said discs into certain of said depressions, and in locking engagement with said slip rods, said means comprising a wedge shaped element adapted to enter between said discs and force them apart, and means for controlling the action of said wedge, comprising a lug on said wedge, a lever pivoted on said base plate, and slidably connected with said wedge, means to move and hold said lever and said wedge into engagement with said discs, and means to oppose said moving and holding means.

4. In a pneumatic gear shift, a cover plate comprising a base plate, a top plate, a dagger slidably mounted between said base and top plates, a lug on said dagger projecting thru a slot in said top plate, a lever pivoted on said base plate, one arm being operatively connected with the clutch control of the car for urging said lever in one direction, resilient means for moving said lever in the opposite direction and means mounted between said plates and actuated by said dagger for locking the gear shifting mechanism when said lever is in one of its extreme positions.

5. In a pneumatic gear shift, a base plate, a top plate, slip rods slidably mounted between said plates, said slip rods having depressions on their opposed faces, a pair of discs slidably mounted between said plates, and between said slip rods, and adapted to enter the depressions in said rods, a dagger slidably mounted, and adapted to be forced between said discs, thereby pushing them into the said depressions, a lug on said dagger, extending thru a slot in said top plate, a lever mounted on said base plate, a slotted head intermediate one arm of said lever, and operatively engaging said lugs, resilient means urging said arm and dagger toward said discs, means operatively connected with the second arm of said lever to move said lever and dagger away from said discs.

In testimony whereof, I have signed my name to this specification this 12th day of March, 1929.

HARRY E. SPENCER.